US011360490B2

United States Patent
Schütz et al.

(10) Patent No.: US 11,360,490 B2
(45) Date of Patent: Jun. 14, 2022

(54) DRIVER ASSISTANCE SYSTEM FOR A TRANSPORTATION VEHICLE, TRANSPORTATION VEHICLE, METHOD FOR OPERATING A DRIVER ASSISTANCE SYSTEM OR A TRANSPORTATION VEHICLE PARKING ROBOT SYSTEM FOR A TRANSPORTATION VEHICLE HAVING A PLURALITY OF WHEELS, AND METHOD FOR OPERATING A PARKING ROBOT SYSTEM

(71) Applicant: VOLKSWAGEN AKTIENGESELLSCHAFT, Wolfsburg (DE)

(72) Inventors: Daniel Schütz, Lehre (DE); Thomas Form, Braunschweig (DE)

(73) Assignee: Volkswagen Aktiengesellschaft

( * ) Notice: Subject to any disclaimer, the term of this patent is extended or adjusted under 35 U.S.C. 154(b) by 298 days.

(21) Appl. No.: 16/693,971

(22) Filed: Nov. 25, 2019

(65) Prior Publication Data

US 2020/0183421 A1 Jun. 11, 2020

(30) Foreign Application Priority Data

Dec. 6, 2018 (DE) ...................... 10 2018 221 167.1

(51) Int. Cl.
| | | |
|---|---|---|
| *G05D 1/02* | (2020.01) | |
| *B60L 50/50* | (2019.01) | |
| *G05D 1/00* | (2006.01) | |

(52) U.S. Cl.
CPC ............ *G05D 1/0295* (2013.01); *B60L 50/50* (2019.02); *G05D 1/0088* (2013.01); *G05D 1/0212* (2013.01)

(58) Field of Classification Search
CPC .. G05D 1/0295; G05D 1/0088; G05D 1/0212; B60L 50/50
See application file for complete search history.

(56) References Cited

U.S. PATENT DOCUMENTS

| | | |
|---|---|---|
| 2005/0240323 A1 | 10/2005 | Orita |
| 2010/0161128 A1 | 6/2010 | Choi et al. |
| | (Continued) | |

FOREIGN PATENT DOCUMENTS

| | | |
|---|---|---|
| CN | 204457020 U | 7/2015 |
| DE | 10020236 A1 | 11/2001 |
| | (Continued) | |

OTHER PUBLICATIONS

Limer (https://www.popularmechanics.com/cars/news/a15281/tiny-robots-move-car-autonomously/) Apr. 28, 2015 (Year: 2015).*

(Continued)

*Primary Examiner* — Peter D Nolan
*Assistant Examiner* — Mikko Okechukwu Obioha
(74) *Attorney, Agent, or Firm* — Barnes & Thornburg, LLP

(57) ABSTRACT

A parking robot system for a transportation vehicle having wheels and a method for operating a parking robot system. The parking robot system includes a main robot and secondary robots and a method for operating a parking robot system. The secondary robots each have a pair of wheel support arms and each move up autonomously, with the wheel support arms folded in, from outside next to one of the wheels of the transportation vehicle. The secondary robots each lift up the respective wheel by folding out the respective pair of wheel support arms. The main robot accompanies the secondary robot with the lifted up transportation vehicle during travel to a prescribed target position.

17 Claims, 2 Drawing Sheets

(56) References Cited

U.S. PATENT DOCUMENTS

2018/0265293 A1* 9/2018 Zuckerman ............ B65G 1/065
2020/0269427 A1* 8/2020 Shikano .................. B25J 5/007

FOREIGN PATENT DOCUMENTS

| | | |
|---|---|---|
| DE | 112009000747 T5 | 7/2011 |
| DE | 102014221770 A1 | 4/2016 |
| DE | 102015203506 A1 | 9/2016 |
| EP | 2937261 A2 | 10/2015 |
| JP | 2007233771 A | 9/2007 |
| JP | 2016216936 A | 12/2016 |
| WO | 2018026347 A1 | 2/2018 |
| WO | 2018109772 A1 | 6/2018 |

OTHER PUBLICATIONS

Kashiwazaki, A Car Transporatation system using multiple mobile robots: iCART 2, 2011 IEEE/RSJ International Conference on intelligent robots and systems, Sep. 25-30, 2011, p. 4593-4600 (Year: 2011).*
Zhongxue et al.; Modern Manufacturing Systems; Xidian University Press; Aug. 2013; pp. 144-145.
Office Action for Chinese Patent Application No. 2019-112428164; dated Nov. 11, 2021.

* cited by examiner

DRIVER ASSISTANCE SYSTEM FOR A TRANSPORTATION VEHICLE, TRANSPORTATION VEHICLE, METHOD FOR OPERATING A DRIVER ASSISTANCE SYSTEM OR A TRANSPORTATION VEHICLE PARKING ROBOT SYSTEM FOR A TRANSPORTATION VEHICLE HAVING A PLURALITY OF WHEELS, AND METHOD FOR OPERATING A PARKING ROBOT SYSTEM

PRIORITY CLAIM

This patent application claims priority to German Patent Application No. 10 2018 221 167.1, filed 6 Dec. 2018, the disclosure of which is incorporated herein by reference in its entirety.

SUMMARY

Illustrative embodiments relate to a parking robot system for a transportation vehicle having a plurality of wheels and to a method for operating such a parking robot system.

BRIEF DESCRIPTION OF THE DRAWINGS

An exemplary embodiment will be described below. In this respect.

DETAILED DESCRIPTION

Figure 1:
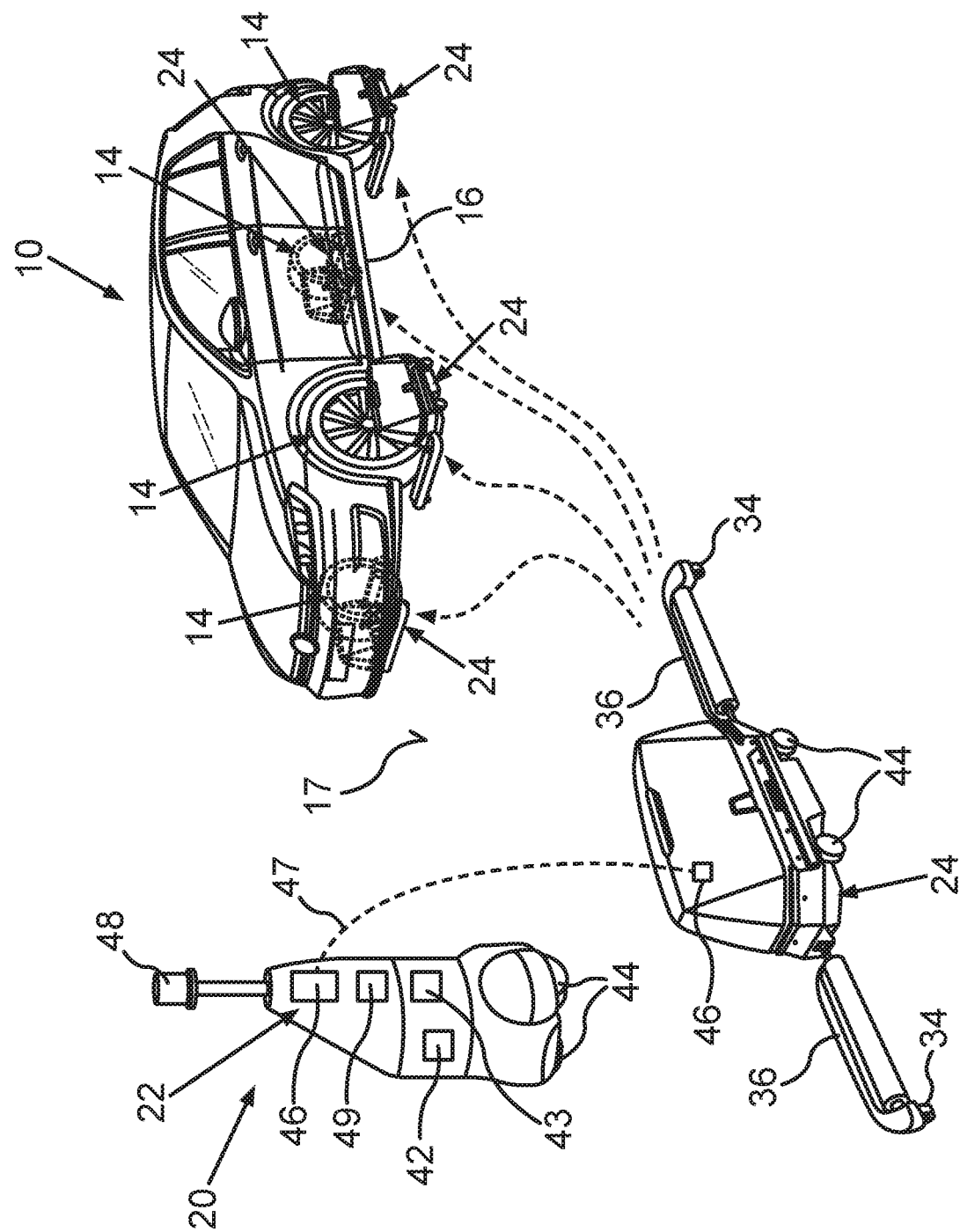
FIG. 1 shows a schematic illustration of a parking robot system for a transportation vehicle in which the transportation vehicle is lifted up by four secondary robots.

A parking robot is usually configured to transport a transportation vehicle within a prescribed infrastructure environment, for example, a multistory carpark, to prescribed parking positions. To do this, the parking robot travels, for example, with at least one part under the transportation vehicle, lifts it up and subsequently travels with the lifted up transportation vehicle to the prescribed parking position at which it sets the transportation vehicle down again. By a parking robot it is, therefore, possible to move transportation vehicles fully autonomously and therefore without involvement of a driver of the transportation vehicle within the infrastructure environment irrespective of whether or not the transportation vehicles have, for example, a driver assistance system for at least partially autonomous parking.

DE 10 2015 203 506 A1 describes an automobile transport unit for positioning of placing transportation vehicles. In this context, the transport unit is embodied in such a way that it can be used to lift up at least one region of the placing transportation vehicle, such as for example, a wheel axis of the placing transportation vehicle with two wheels.

DE 10 2014 221 770 A1 describes a method for operating a towing-away robot, wherein when a fault occurs during autonomous travel of a transportation vehicle within a carpark the towing-away robot is engaged to tow away the transportation vehicle to a predetermined position.

US 2010/0161128 A1 describes an autonomous parking supervision system which comprises inter alia a movable parking robot for raising and carrying transportation vehicles. In addition, the system comprises a parking guidance server which provides the parking robot with information relating to a travel trajectory to a desired parking position. In the region of the automated parking supervision system, a plurality of supervision posts are also installed which monitor the travel along the parking trajectory by the robot carrying the transportation vehicle.

Disclosed embodiments make available a solution with which a parking robot can be operated which moves quickly within a parking environment.

The disclosed embodiments are based on the realization that with conventional single-part or multi-part parking robots which are positioned underneath the transportation vehicle and which lift up its four wheels it is possible to travel only at low speeds within an infrastructure environment, such as, for example, a multistory carpark. In addition, in particular, single-part conventional parking robots have the property that they frequently cannot be used to overcome ramps or other steep inclines. The background for this is, for example, a plate of such parking robots which is near to the ground sets down, for example, on the ramp so that the ramp cannot be overcome, since the parking robot sets down on it. A parking robot which can deal with ramps would, for example, be implemented by virtue of the fact that the parking robot has individual robot parts which are arranged on the individual wheels of the transportation vehicle. A parking robot which travels quickly through the multistory carpark could then be implemented, for example, by providing an additional robot which as a guiding robot assists the robots carrying the transportation vehicle and, for example, while traveling ahead of the latter guides the system composed of a plurality of individual robots through the multistory carpark.

The disclosed parking robot system for a transportation vehicle having a plurality of wheels comprises a main robot and a plurality of secondary robots. If the transportation vehicle comprises, for example, four wheels, two on a front axle and two on a rear axle of the transportation vehicle, the parking robot system comprises four secondary robots in addition to the main robot. The main robot constitutes here the guiding robot of the robot system, and the four secondary robots constitute the robots which carry the transportation vehicle. Each of the secondary robots respectively has a pair of wheel support arms and is respectively configured to move up, with the wheel support arms folded in, autonomously from the outside next to, in each case, one of the wheels of the transportation vehicle. Each individual secondary robot therefore has a total of two wheel support arms which are each at least as long in a longitudinal direction as a wheel of the transportation vehicle is wide. When wheel support arms are folded in, they are arranged parallel to a longitudinal direction of the secondary robot, so that the respective secondary robot arranges itself, with the wheel support arms folded in, perpendicularly in relation to a respective wheel axle of the transportation vehicle next to one of the wheels of the respective wheel axle of the transportation vehicle when the secondary robot moves autonomously up to the transportation vehicle. The corresponding actuation commands can be conveyed to the secondary robot by the main robot, and are made available by an infrastructure control device, for example, a multistory carpark, in which the parking robot system is used to park transportation vehicles, or the control commands are determined by the secondary robot itself. The secondary robots are additionally each configured to lift up the respective wheel of the transportation vehicle by folding out the respective pair of wheel support arms. By pivoting out the respective wheel support arms from the folded-in position to a folded-out position, the respective wheel support arms approach the respective wheel and force it upward from both sides by building up pressure on opposite sides of the lateral surface. When the respective wheel support arms fold in, the respective wheels are therefore ultimately forced upward in a vertical direction of the transportation vehicle so that when the respective wheel support arms are at an angle in relation to the outer wall of the respective secondary robot which is typically 90 degrees, the transportation vehicle is completely lifted off from the travel surface. When wheel support arms are respectively folded in, they are therefore in a position of use of the respective wheel support arms. Each individual secondary robot is therefore configured to lift up in each case one of the wheels of the transportation vehicle so that ultimately the transportation vehicle is supported by the, for example, four secondary robots in total. This raising by the secondary robots can typically take place simultaneously or, for example, on a wheel axle basis, wherein, in the case of raising on a wheel axle basis, for example, the transportation vehicle is initially lifted up in the region of the front axle by two secondary robots which are arranged on wheels of a front axle of the transportation vehicle, and only after this is the transportation vehicle also lifted up in the region of the rear axle by two secondary robots which are arranged on wheels of a rear axle of the transportation vehicle.

The main robot is then configured to accompany the secondary robots with the lifted up transportation vehicle during travel to a prescribed target position. The prescribed target position is, for example, a prescribed placing location within the multistory carpark which makes available the parking robot system as infrastructure environment. The main robot is also configured to direct the secondary robots with the lifted up transportation vehicle to a specific location within the multistory carpark and in the process travel along with them and/or actually lead them. The main robot therefore constitutes the guiding robot which the plurality of secondary robots can follow, the secondary robots therefore constituting following robots. By virtue of the accompanying role of the main robot it may be possible, for example, for the respective secondary robots to be embodied only with simple technical equipment and, for example, to provide components which are important to the system, such as a control device or a sensor device only in the main robot. In addition, the respective lifting up of the individual wheels of the transportation vehicle with respective individual secondary robots makes it possible for ramps, steep inclines and other obstacles, such as, for example, potholes or other uneven portions of the underlying surface, to be able to be overcome with the parking robot system. The parking robot system therefore constitutes a transportation vehicle parking robot system which can deal with ramps and with which target positions at different levels of a piece of infrastructure, for example, different parking levels of a multistory carpark, can be traveled to. As a result of the fact that with the main robot, a guiding robot, which can also be referred to, for example, as a pilot robot, accompanies the secondary robots with the lifted up transportation vehicle to the prescribed target position, it is additionally possible that the parking robot system can move at relatively high speeds in comparison with conventional parking robots without a guiding robot, since, for example, sensing of the surroundings and planning of a travel trajectory of the main robot permit the secondary robots to be accompanied by the main robot in a predicted state. For this reason, the individual robots of the parking robot system, that is to say the main robot and the plurality of secondary robots, can travel at higher speeds, for example, within the multistory carpark, than robots of conventional parking robot systems.

In at least one disclosed embodiment there is provision that the main robot comprises a sensor device. This sensor device can comprise, for example, a camera, a lidar device, a radar device, an ultrasonic device, a laser scanner or infrared sensor. The sensor device of the main robot is configured to cover the surroundings of the main robot. With the sensor device it is possible, for example, to sense pillars within a multistory carpark or other transportation vehicles which are located in the surroundings of the transportation vehicle which is carried by the parking robot system. In addition, the sensor device is configured to determine the location of obstacles for the parking robot and the respective secondary robots with the lifted-up transportation vehicle in the sensed surroundings. As soon as the sensor device has sensed, for example, the pillar within the multistory carpark, it determines its location, on the one hand, relative to the main robot and, on the other hand, relative to the respective secondary robots with the lifted up transportation vehicle. In this context, for example, map material which is available for the multistory carpark is taken into account.

The main robot is therefore provided with data which characterize which objects and potential obstacles are located in the current surroundings of all components of the parking robot system, and which stop and/or if appropriate, move the robot. The sensor device may be arranged above at a great height, that is to say at a large distance from a travel surface on which the main robot and the secondary robots travel. The main robot therefore may have a tower-like form and has a greater extent in the vertical direction of the main robot than in the transverse direction of the main robot. The height of the main robot may be greater than a height of the transportation vehicle in the vertical direction of the transportation vehicle, wherein the sensor device is arranged in an upper part of the main robot. The main robot could therefore be reminiscent in terms of its shape of a person standing upright, wherein the sensor device is arranged at a height in the main robot which corresponds to a head region of the person. The main robot therefore has the necessary sensors to acquire reliable information about the current surroundings of individual components of the parking robot system. This acquisition of sensor data by the main robot makes it possible to be able to sense obstacles even at a greater distance from the parking robot system than is possible, for example, with robots which are only near to the floor or sensor devices which are arranged in the vicinity of the floor. This makes it possible for relatively high speeds to be made possible with the parking robot system in comparison with conventional parking robot systems.

In addition, there is provision that the main robot comprises a control device which is configured to determine a respective travel trajectory for the respective secondary robot and a travel trajectory for the main robot to the prescribed target position. The determination this travel trajectory, that is to say the determination of a route from a current starting position to the prescribed target position, which is, for example, a parking position in a multistory carpark, is therefore performed by the control device. In this context, the control device takes into account map data which are made available to the control device. This map data can be stored, for example, within the control device or else can be made available to the control device, for example, via a communication connection to an infrastructure control device, for example, a multistory carpark control device. In addition, during the determination of the respective travel trajectories the surroundings sensed by the sensor device and/or the obstacles in the surroundings whose location is determined with the sensor device are taken into account. If, for example, another transportation vehicle approaches the transportation vehicle which is being carried, for example, by four secondary robots and is being accompanied by a main robot to a parking position within a multistory carpark, this other transportation vehicle possibly constitutes an obstacle for the transportation of the transportation vehicle with the parking robot system. If this is the case, this other transportation vehicle which is sensed in the surroundings of the transportation vehicle and whose location is determined is taken into account, for example, during the determination of an avoidance trajectory, wherein this corrected travel trajectory, that is to say the avoidance trajectory, is subsequently taken into account via the individual components of the parking robot system, the main robot and the four secondary robots during the further travel to the target position. This therefore makes possible reliable transportation of the transportation vehicle with the parking robot system within the infrastructure device, that is to say the multistory carpark.

In a further disclosed embodiment there is provision that the main robot comprises an electric main drive machine, a battery for supplying the electric main drive machine with electrical energy and at least one drive wheel for moving the main robot. The main robot can therefore be actuated autonomously by the control device by these specified components and can move autonomously, for example, on different parking levels of a multistory carpark, wherein the main robot is driven by the main drive machine, the battery and the at least one drive wheel. The control device is additionally configured to actuate the main robot in accordance with the determined travel trajectory for the main robot by the electric main drive machine. The main robot therefore has the described drive system with which it is configured to be able to accompany the secondary robots with the lifted up transportation vehicle during their travel to the prescribed target position. A drive and a controller of the main robot are independent of the plurality of secondary robots here. The main robot can as a result guide, for example, the secondary robot with the lifted up transportation vehicle to the prescribed target position while traveling in front of the secondary robots. The main robot is therefore configured to move autonomously and independently of the secondary robots within the infrastructure environment, as a result of which the main robot is suitable as a guiding robot of the parking robot system.

In addition, in a further disclosed embodiment there is provision that the main robot comprises a communication interface for a respective communication connection to the respective secondary robots, and the control device is configured to make available the respective travel trajectory for the respective secondary robot to the respective secondary robot via the respective communication connection. This communication connection can be implemented, for example, by a radio link, such as, for example, a WLAN communication connection. The control device of the main robot communicates respective actuation instructions, that is to say respective travel trajectories, to the respective secondary robots via the respective communication connection. The respective secondary robot therefore does not have to be configured in each case to determine its respective travel trajectories itself. As a result, a cost-effective parking robot system becomes possible, since any information and components for determining respective travel trajectories are necessary only in the main robot, but not in the plurality of secondary robots.

In a further disclosed embodiment there is provision that each of the secondary robots respectively comprises an electric secondary drive machine, a battery for supplying the respective electric secondary drive machine with electrical energy and a communication interface for a communication connection to the main robot. The respective secondary robots therefore also have their own drive so that, the respective secondary robot can be moved, for example, by at least one drive wheel of the secondary robot. In a simplest refinement, the respective secondary robots receive their respective travel trajectories from the main robot, in response to which the secondary robots each travel autonomously through the infrastructure device according to their respective received travel trajectory. In addition, signals corresponding to the respective secondary robots can be conveyed via the communication connection, on the basis of which signals the respective pair of wheel support arms is folded out or in. Corresponding actuation instructions for lifting up or setting down the respective wheel of the transportation vehicle can therefore also be conveyed from the main robot to the respective secondary robots. As a result, the secondary robots are possible with simple equipment which can be manufactured cost-effectively but is nevertheless configured in conjunction with the main robot to transport quickly a transportation vehicle from the starting position to the target position jointly as a parking robot system.

The respective secondary robot may be implemented here as a narrow secondary robot whose depth, that is to say whose extent perpendicular to a folded-up position of the respective rolling support arms, is typically 35 centimeters, that is to say whose width is approximately two lengths of a folded-out exterior rear view mirror of the transportation vehicle. The relatively narrow secondary robots can therefore still travel between, for example, two transportation vehicles parked next to one another even in the case of transportation vehicles which are parked relatively closely to one another, and the secondary robots can approach from the outside next to, in each case, one of the wheels of the transportation vehicle and position themselves in front of it. By the described secondary robots, space-saving and tight setting down of the transportation vehicles next to one another within the infrastructure environment is therefore also possible.

In a further disclosed embodiment there is provision that at least one secondary robot comprises a sensor unit and a control unit. This secondary robot can comprise, for example, a camera, a distance sensor, a laser scanner, an infrared camera or a radar device and is therefore configured to sense surroundings of a secondary robot and to determine the location of obstacles in these sensed surroundings. The sensor unit is therefore configured to sense the surroundings of the at least one secondary robot and to determine the location of obstacles for the at least one secondary robot in the sensed surroundings. If this takes place, it is possible, for example, for the control unit of the secondary robot to determine its own travel trajectory for the secondary robot. During the determination thereof, it is possible, for example, to take into account map data which is made available either by the main robot and/or an infrastructure control device or be stored in the control unit of the secondary robot.

In a simple refinement it is then possible that only the movement of the secondary robot from the outside next to one of the wheels of the transportation vehicle is assisted by the sensor unit and the control unit of the secondary robot. For example, with the sensor unit it is possible to determine precisely when the secondary robot is located in an optimum position to the side of the respective wheel. For example, a laser scanner as a sensor unit of the secondary robot is suitable for determining the location of the wheel of the transportation vehicle. However, the secondary robot is subsequently actuated in accordance with the travel trajectory which is made available by the main robot.

In a relatively complex refinement, by the sensor unit and the control unit the secondary robot can be actuated independently of the main robot and the other secondary robots during travel. Such a procedure is suitable, for example, for travel at low speeds of typically five to six kilometers per hour within the known and prescribed infrastructure environment. However, the secondary robots are less high than the main robot so that the viewing field of the sensor unit of the secondary robot is restricted in comparison with the sensor unit of the main robot. Nevertheless, by the sensor unit and the control unit of the secondary robot it is possible to increase the reliability of the entire parking robot system to the effect that, for example, relatively low obstacles which approach the transportation vehicle, for example, in the region of the secondary robot and therefore cannot be sensed, for example, by the sensor device of the main robot, can now be sensed. Such an obstacle may be, for example, a ball rolling toward the transportation vehicle from the rear. On the basis of the sensor data of the corresponding secondary robot it is then possible to adapt the respective travel trajectory of the individual components of the parking robot system to this obstacle.

In addition, the at least one secondary robot can have, for example, a light, that is to say comprises a light device, so that the secondary robot can be detected quickly and reliably by other participants in the traffic and, if appropriate, by sensor devices of the infrastructure element, such as the multistory carpark, as well as of the main robot. For example, a flashing red light in an upper region of the secondary robot is suitable as such markings of the respective secondary robot.

Finally, each of the individual secondary robots can be configured also to transport the transportation vehicle from the starting position to the target position independently of the main robot. However, owing to the restricted range of vision of the respective sensor unit of the respective secondary robot such transportation of the transportation vehicle is possible only at a lower speed than would possible with assistance from the main robot.

In a further disclosed embodiment there is provision that the respective wheel support arms of the respective secondary robots have respective sliding rollers. These sliding rollers are configured in such a way that when they approach from two opposite sides, to the side of the lateral surface of the respective wheel, they can roll on the respective wheel of the transportation vehicle so that ultimately by further folding in of the respective wheel support arms the wheel of the transportation vehicle is lifted off from the travel surface. The respective sliding rollers are arranged here in a folded-out position of the respective wheel support arms in a longitudinal direction parallel to a wheel axle of the transportation vehicle. In this position, the respective wheel support arms are therefore arranged perpendicularly with respect to a circular wheel surface of the respective wheel of the transportation vehicle. Ultimately, when the wheel support arms are folded in, a rotational axis about which the respective sliding rollers can rotate is therefore arranged parallel to the respective wheel axle of the transportation vehicle on which the respective wheel is arranged. By forcing the wheel support arms against the respective wheel of the transportation vehicle as the arms fold in, the wheel can slide on the sliding rollers, wherein ultimately when the respective wheel support arms have reached their end position in which they are parallel to the wheel axles of the transportation vehicle the wheel can be lifted off from the transportation vehicle floor. The respective sliding runners are therefore configured as passive rollers which are continuously rotatable. As a result of the application of force on both sides with respective wheel support arms against the respective wheel it is ensured that when the transportation vehicle is lifted up and, if appropriate, set down the transportation vehicle does not roll away and in addition, the lifting up and the setting down are efficient with respect to necessary energy for lifting up or setting down the transportation vehicle. It is therefore possible to implement in a technically simple way a process in which a respective wheel of the transportation vehicle is lifted up by a respective secondary robot of the parking robot system and held and set down again.

According to the disclosure, in addition a method for operating a parking robot system is provided. In this context, a parking robot system such as has already been described above is operated. The refinements which are presented in conjunction with the disclosed parking robot system therefore apply correspondingly, in so far as they can be applied, to a disclosed method for operating a parking robot system. This method comprises the following: respective autonomous moving up of the secondary robots with respective folded-in wheel support arms from the outside next to, in each case, one of the wheels of the transportation vehicle, raising the respective wheels of the transportation vehicle by folding out the respective pairs of wheel support arms, accompanying the secondary robots with the lifted up transportation vehicle during travel to a prescribed target position by the main robot. By the disclosed method it is therefore possible to transport reliably at high speed, with assistance by the main robot, a transportation vehicle which has been lifted up by the secondary robots, from a starting position to the prescribed target position, for example, from a delivery position at the entrance of a multistory carpark to a parking position in an upper floor of the same multistory carpark.

For the disclosed method there is provision in at least one exemplary embodiment that the main robot and the respective secondary robots which support the lifted up transportation vehicle move, in accordance with the respective travel trajectories for the main robot and for the respective secondary robots, to the prescribed target position, and the respective secondary robots set the transportation vehicle down there by folding in the respective pairs of wheel support arms. The respective secondary robots set the transportation vehicle down there by folding in the respective pairs of wheel support arms. Subsequently, the secondary robots can be instructed, for example, by corresponding actuation commands of the main robot and/or an infrastructure control device, for example, a multistory carpark, to move away from the transportation vehicle and, for example, to follow the main robot to a further transportation vehicle which is also to be moved by the parking robot system and the disclosed method to a respective target position of this transportation vehicle within, for example, the multistory carpark. By the method for operating the parking robot system it is possible for transportation vehicles and/or other transportation vehicles to be moved and parked efficiently within an infrastructure environment with the method.

The disclosure also includes developments of the disclosed method which have features such as have already been described in conjunction with developments of the disclosed parking robot system. For this reason, the corresponding developments of the disclosed method are not described once more here.

The disclosure also includes the control device of the parking robot and, if appropriate, the control unit of the respective secondary robot. The control device and/or the control unit each have a processor device which is configured to implement an exemplary embodiment of the disclosed method. The processor device can for this purpose have at least one microprocessor and at least one microcontroller. Furthermore, the processor device can have a program code which is configured to implement the exemplary embodiment of the disclosed method when the program code is executed by the processor device. The program code can be stored in a data memory of the processor device.

In the exemplary embodiment explained below, the described components of the embodiment each constitute individual features which can be considered independently of one another and which develop in each case also independently of one another and therefore are also to be considered as components individually or in any combination other than that shown. Furthermore, the described embodiment can also be supplemented by further features which have already been described.

In the figures functionally identical elements are respectively provided with the same reference symbols.

A transportation vehicle 10 which has four wheels 14 is outlined in FIG. 1. This transportation vehicle 10 has been parked, for example, in an entry region of a multistory carpark and is then to be transported to a target position within this multistory carpark by a parking robot system 20. The parking robot system 20 comprises a main robot 22 and four secondary robots 24.

The secondary robots 24 are each configured to move up, autonomously from the outside next to, in each case, one of the wheels 14 of the transportation vehicle 10, with the wheel support arms 36, of which they comprise in each case one pair, folded in. For this purpose, each individual secondary robot 24 has two drive wheels 44. As an alternative to this, each of the secondary robots 24 can have merely one drive wheel 44 and in addition to this, for example, for reasons of stability, can have a further roller 34. In addition, for reasons of stability respective rollers 34 are arranged at respective outer ends of the respective wheel support arms 36. The respective secondary robots 24 additionally each have a communication interface 46 with which they can receive respective data from the main robot 22 via a respective communication connection 47, for example, a radio link, such as, for example, a WLAN connection. The individual components of the respective secondary robots 24 are indicated in FIG. 1 for only one of the outlined secondary robots 24. After the respective secondary robots 24 have positioned themselves from the outside next to in each case one of the four wheels 14 of the transportation vehicle 10, the respective wheel 14 is lifted up by folding out the respective pair of wheel support arms 36. This operation has already been passed for the wheels 14 of the transportation vehicle 10 in FIG. 1. By four secondary robots 24 which are positioned on the transportation vehicle 10, it is possible to increase a distance between a transportation vehicle floor 16 of the transportation vehicle 10 and a travel surface 17 by lifting up the transportation vehicle 10. In addition, in FIG. 1 a fifth secondary robot 24 is outlined which travels autonomously toward the transportation vehicle 10. This fifth secondary robot has folded-in wheel support arms 36, that is to say the position of the wheel support arms 36 which each of the secondary robots 24 assumes when it has not lifted up a wheel 14 of a transportation vehicle 10.

The main robot 22 of the parking robot system 20 comprises a sensor device 48, a control device 49, a communication interface 46 for respective communication connections 47 to the respective secondary robots 24, a main drive machine 42 and a battery 43 for supplying the electric main drive machine 42 with electrical energy. In addition, the main robot 22 has at least one drive wheel 44 so that the main robot 22 can be moved autonomously. The main robot 22 is configured to accompany the secondary robots 24 with the lifted up transportation vehicle 10 during travel within the multistory carpark to the prescribed target position, that is to say to the prescribed parking position within the multistory carpark. The main robot 22 of the parking robot system 20 therefore constitutes a guiding robot which can guide the secondary robots 24 to the prescribed parking position or at least can travel with the secondary robots 24 to the position.

The sensor device 48 of the main robot 22 is configured to sense surroundings of the main robot 22 and to determine the location of obstacles for the main robot 22 and the respective secondary robots 24 with the lifted up transportation vehicle 10 in the sensed surroundings. The sensor device 48 is, for example, a camera, a radar device, an ultrasonic device, a laser scanner or a lidar device.

The control device 49 of the main robot 22 is configured to determine a respective travel trajectory for the respective secondary robots 24 and a travel trajectory for the main robot 22 to the prescribed target position. In this context, the control device 49 takes into account map data which is made available to the control device 49, the sensed surroundings of the transportation vehicle and/or the obstacles whose location has been determined. The map data can be made available to the main robot 22 in this context, for example, by an infrastructure control device, that is to say, for example, by a carpark administration server. As an alternative to this, this map data can also be stored in the control device 49 of the transportation vehicle 10.

The control device 49 conveys the respective travel trajectory for the respective secondary robot 24 to the respective secondary robot 24 via the communication interface 46. In addition, the control device 49 is configured to actuate the main robot 22 in accordance with the determined travel trajectory for the main robot 22 by the electric main drive machine 42.

Figure 2:
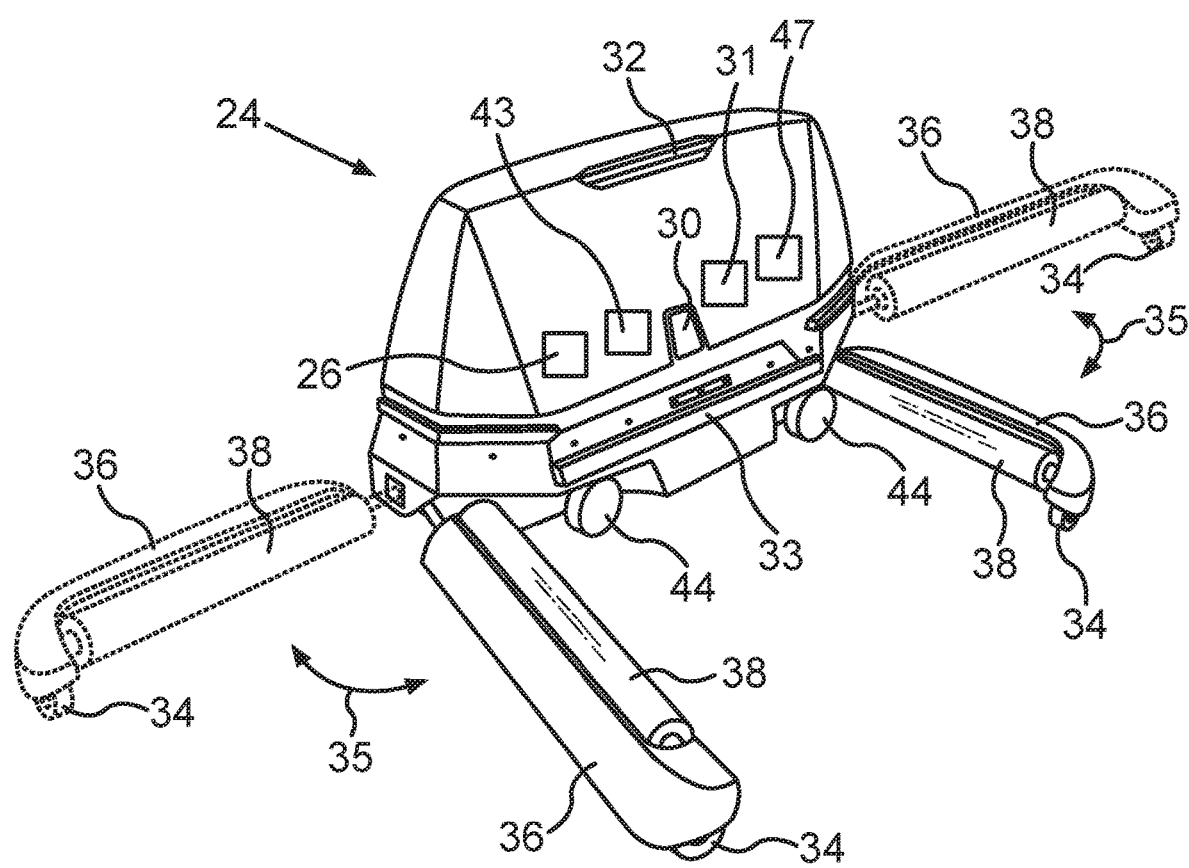
FIG. 2 shows a schematic illustration of a secondary robot of a parking robot system.

In FIG. 2, the secondary robot 24 of the parking robot system 20 is outlined in detail. The secondary robot 24 has an electric secondary drive machine 26, a battery 43 for supplying the electric secondary drive machine 26 with electrical energy, at least one drive wheel 44 and the communication interface 46 for the communication connection 47 to the main robot 22. In addition to this, a communication connection 47 to the infrastructure device, that is to say to the multistory carpark administration server, can also be possible via the communication interface 46.

In addition, the secondary robot 24 has its own sensor unit 30 and its own control unit 31. By the sensor unit 30, the secondary robot 24 is configured to sense the surroundings of the secondary robot 24 and to determine the location of obstacles for the secondary robot 24 in the sensed surroundings. The secondary robot 24 can therefore be configured to determine its own travel trajectory. In one simple configuration, the secondary robot 24 can also merely be configured to be able to position the respective wheel 14 of the transportation vehicle 10 precisely, since, for example, with its sensor unit 30, which is, for example, an ultrasonic device, a laser scanner, a camera or a radar device, it can determine the location of the respective wheel 14 in its surroundings and sense the wheel 14. The sensor unit 30 is additionally configured to determine the location of an obstacle in the surroundings of the secondary robot 24, such as for example, a ball rolling toward the secondary robot 24, and to convey the corresponding data to the main robot 22 and/or carry out an emergency stop of the secondary robot 24.

The secondary robot 24 additionally has a light 32. By the latter it is possible to alert other participants in the traffic within the multistory carpark to the secondary robot 24 which is low in comparison with the transportation vehicle 10 and the main robot 22. In addition, the secondary robot 24 has a bumper 33 which serves to assist the distance control of the secondary robot 24 from the main transportation vehicle 10 in the scope of the lifting up, transportation and setting down processes of the respective wheel 14 of the transportation vehicle 10.

The respective folding direction 35 of the wheel support arms 36 is also outlined in FIG. 2. Here, the position of the wheel support arms 36 relative to the rest of the secondary robot 24 when the wheel support arms 36 are folded in is outlined with dashed contours. When the wheel support arms 36 are folded out, they are moved to the position outlined with a continuous line. The respective wheel support arms 36, of which the secondary robot 24 comprises precisely one pair, additionally have respective sliding rollers 38. The rotational axis of the sliding rollers 38 is arranged parallel to a respective wheel axis of the transportation vehicle 10 in the folded-out position. In the folded-in position, the wheel support arms 36 can alternatively or additionally be arranged in a recess in a respective prolongation of the secondary robot 24.

Overall, the examples show how the parking robot system 20 can be used to park the transportation vehicle 10 autonomously with low expenditure. This multi robot system as a parking robot system 20 is therefore composed of a pilot robot, the main robot 22 and at least one further secondary robot 24. This at least one secondary robot 24 is provided here to pick up, to convey and to put down transportation vehicles such as, for example, the transportation vehicle 10, at the target position. In this context, both the main robot 22 and the at least one secondary robot 24 are each configured to travel autonomously, and additionally in such a way as to cope with ramps. With the parking robot system 20 it is therefore possible to overcome obstacles and, if appropriate, travel around them. In one refinement the at least one secondary robot 24 can have a flat design.

The main robot 22 is not located on the transportation vehicle 10 and can move independently of the other secondary robots 24. The main robot 22 therefore comprises its own energy supply, that is to say the battery 43, the sensor device 48, the control device 49 and the main drive machine 42 and can therefore operate as a guiding robot for the at least one secondary robot 24. The at least one secondary robot 24 also has its own energy supply, specifically the battery 43 and the secondary drive machine 26 and therefore has its own drive control. The at least one secondary robot 24 can obtain information for a current driving task and a future driving task from the main robot 22 via the communication interface 46 and process the information, that is to say receive a respective travel trajectory and be actuated in accordance therewith.

LIST OF REFERENCE NUMBERS

10 Transportation vehicle
14 Wheel
16 Transportation vehicle floor
17 Travel surface
20 Parking robot system
22 Main robot
24 Secondary robot
26 Secondary drive machine
30 Sensor unit
31 Control unit
32 Light
33 Bumper
34 Roller
35 Folding direction
36 Wheel support arm
38 Sliding rollers
42 Main drive machine
43 Battery
44 Drive wheel
46 Communication interface
47 Communication connection
48 Sensor device
49 Control device

The invention claimed is:

1. A parking robot system for a transportation vehicle having a plurality of wheels, wherein the parking robot system comprises:
a main robot; and
a plurality of secondary robots configured for autonomous movement, each secondary robot including a pair of wheel support arms operable between a folded-in position and a folded-out position in which each support arm of the pair is articulated towards each other relative to the folded-in position, each secondary robot configured to position itself next to one of the wheels of the transportation vehicle, and to lift up the respective wheel by folding out the respective pair of wheel support arms into the folded-out position to engage the respective wheel, and
wherein the main robot accompanies the secondary robot with the lifted up transportation vehicle during travel to a prescribed target position.

2. The parking robot system of claim 1, wherein the main robot comprises a sensor device to sense surroundings of the main robot to determine location of obstacles in the sensed surroundings, for the main robot and for the respective secondary robots with the lifted up transportation vehicle.

3. The parking robot system of claim 1, wherein the main robot comprises a control device to determine a respective travel trajectory for the respective secondary robots and a travel trajectory for the main robot to the prescribed target position taking into account map data made available by the control device, the sensed transportation vehicle surroundings and/or the obstacles whose location has been determined.

4. The parking robot system of claim 1, wherein the main robot comprises an electric main drive machine, a battery for supplying the electric main drive machine with electrical energy and at least one drive wheel for moving the main robot.

5. The parking robot system of claim 3, wherein the main robot comprises a communication interface for a respective communication connection to the respective secondary robots, and the control device makes available the respective travel trajectory for the respective secondary robot to the respective secondary robot via the respective communication connection.

6. The parking robot system of claim 1, wherein each of the secondary robots respectively comprises an electric secondary drive machine, a battery for supplying the respective electric secondary drive machine with electrical energy and a communication interface for a communication connection to the main robot.

7. The parking robot system of claim 1, wherein at least one of the secondary robots comprises a sensor unit and a control unit which senses the surroundings of the at least one secondary robot to determine the location of obstacles for the at least one secondary robot in the sensed surroundings.

8. The parking robot system of claim 1, wherein the respective wheel support arms of the respective secondary robot have respective sliding rollers which, in a folded-out position of the respective wheel support arms, are arranged in a longitudinal direction of the respective sliding rollers parallel to a wheel axle of the transportation vehicle.

9. A method for operating a parking robot system, the method comprising:
   autonomously moving secondary robots with respective folded-in wheel support arms next to one of the wheels of a transportation vehicle;
   folding out the respective pairs of wheel support arms from a folded-in position into a folded out position to engage the respective wheels and raising the respective wheels of the transportation vehicle; and
   accompanying the secondary robots with the lifted up transportation vehicle during travel to a prescribed target position by a main robot.

10. The method of claim 9, wherein the main robot and the respective secondary robots which support the lifted up transportation vehicle move, transport the transportation vehicle in accordance with the respective travel trajectories for the main robot and for the respective secondary robots, to the prescribed target position, and the respective secondary robots set the transportation vehicle down in the prescribed target position by folding in the respective pairs of wheel support arms.

11. The method of claim 10, further comprising sensing surroundings of the main robot using a sensor device of the main robot to determine location of obstacles in the sensed surroundings, for the main robot and for the respective secondary robots with the lifted up transportation vehicle.

12. The method of claim 10, further comprising determining, by a control device of the main robot, a respective travel trajectory for the respective secondary robots and a travel trajectory for the main robot to the prescribed target position taking into account map data made available by the control device, the sensed transportation vehicle surroundings and/or the obstacles whose location has been determined.

13. The method of claim 10, further comprising moving the main robot using an electric main drive machine, a battery for supplying the electric main drive machine with electrical energy and at least one drive wheel of the main robot.

14. The method of claim 13, wherein the main robot and the secondary robots communicate via a communication interface for a respective communication connection to the respective secondary robots, and the control device makes available the respective travel trajectory for the respective secondary robot to the respective secondary robot via the respective communication connection.

15. The method of claim 10, wherein each of the secondary robots respectively comprises an electric secondary drive machine, a battery for supplying the respective electric secondary drive machine with electrical energy and a communication interface for a communication connection to the main robot.

16. The method of claim 10, wherein at least one of the secondary robots comprises a sensor unit and a control unit, wherein the method further comprises the sensor unit and control unit sensing the surroundings of the at least one secondary robot to determine the location of obstacles for the at least one secondary robot in the sensed surroundings.

17. The method of claim 10, wherein the respective wheel support arms of the respective secondary robot have respective sliding rollers which, in a folded-out position of the respective wheel support arms, are arranged in a longitudinal direction of the respective sliding rollers parallel to a wheel axle of the transportation vehicle.

* * * * *